United States Patent [19]

Baney et al.

[11] 4,310,651

[45] Jan. 12, 1982

[54] METHOD FOR PREPARING SILICON CARBIDE

[75] Inventors: Ronald H. Baney; John H. Gaul, Jr., both of Midland, Mich.

[73] Assignee: Dow Corning Corporation, Midland, Mich.

[21] Appl. No.: 135,567

[22] Filed: Mar. 31, 1980

Related U.S. Application Data

[63] Continuation-in-part of Ser. No. 24,137, Mar. 26, 1979, which is a continuation-in-part of Ser. No. 910,247, May 30, 1978, abandoned.

[51] Int. Cl.³ .............................................. C08G 77/06
[52] U.S. Cl. ...................................... 528/21; 264/85; 264/101; 264/236; 264/347; 423/345; 556/430; 556/468; 528/23; 528/33
[58] Field of Search .................. 528/21, 23, 33; 423/345; 556/430, 468; 264/85, 101, 236, 347

[56] References Cited

U.S. PATENT DOCUMENTS

| | | | |
|---|---|---|---|
| 2,842,580 | 7/1958 | Gilbert et al. | 556/472 |
| 3,878,234 | 4/1975 | Atwell et al. | 556/468 |
| 4,052,430 | 10/1977 | Yajima et al. | 556/430 |
| 4,059,607 | 11/1977 | Reedy et al. | 556/468 |

*Primary Examiner*—Melvyn I. Marquis
*Attorney, Agent, or Firm*—Robert L. McKellar

[57] ABSTRACT

What is disclosed is an improved method of preparing silicon carbide which is characterized by the preparation of a specific pre-silicon carbide polymer. The method allows the preparation of silicon carbide from specific polysilane polymers without the cumbersome extractions and purifications found in the newer methods of silicon carbide preparation.

2 Claims, No Drawings

METHOD FOR PREPARING SILICON CARBIDE

BACKGROUND OF THE INVENTION

This application is a continuation-in-part of an application which was filed Mar. 26, 1979 as Ser. No. 024,137 which was a continuation-in-part of application Ser. No. 910,247, filed May 30, 1978, now abandoned.

The physical properties of silicon carbide have been known and fully appreciated by research and development people since it was first discovered and patented in 1891 by Acheson.

For example, silicon carbide is known to have chemical inertness, semiconducting properties, extreme hardness, abrasiveness in the powdered form and it is stable to extremely high temperatures. It therefore finds many uses such as in high temperature electrical heating units, furnace walls, mufflers, abrasives, rocket nozzles, automotive engine parts and turbine parts.

The early preparation of silicon carbide was a straightforward reaction involving heating high grade silica and coke in a furnace at very high temperatures, on the order of 1975°–2630° C. The crystalline material obtained by this method is crushed and cleaned by washing with acids and alkali. It is used primarily in the crushed or powdered form mainly as a powder bound by resinous matrices. It is also hot pressed and sintered to give fabricated shapes and drawn to give fibers.

Recently, there has been a trend in simplifying the procedure for fabricating silicon carbide and silicon carbide containing articles through improvements in the methods of obtaining the silicon carbide itself. Previous methods suffered from difficulty in handling which in turn led to the high cost normally associated with silicon carbide articles.

Late in 1974 and early in 1975, several new approaches to the manufacture of silicon carbide were reported. Wolfgang Verbeek in U.S. Pat. No. 3,853,567 reported that he could form a shaped article, such as a fiber, consisting of a mixture of silicon carbide and a silicon nitride by pyrolyzing a silazane at about 200° to 800° C. to form a fusible carbosilazane resin and then forming a fiber and heating the fiber in an inert atmosphere to about 800° to 2000° C. The silazanes which he found useful were prepared from halosilanes and amines and included monomeric, cyclic and polymeric materials. The silazane compound is converted into a fusible carbosilazane resin by pyrolysis by passing the compound through a pipe heated to about 200°–800° C. which has been filled with a packing such as ceramic saddles. The resin, after devolatizing, is a yellow to red-brown, transparent, brittle, hydrolysis-insensitive product.

Verbeek's polymers have a high carbon to silicon ratio and therefore are not susceptible of high yields. Also, Verbeek's process does not allow for control over the molecular structure and/or molecular weight of the polymers.

Other investigators, Seishi Yajima and his associates at the Japanese Research Institute for Iron, Steel and other Metals, Tohoku University, have been working in the field of silicon carbide preparation. They have reported their work extensively and for purposes of this discussion, the subject matter of their work will be condensed by relying on their summary disclosure in Chemistry Letters, pp. 551–554, 1975, published by the Chemical Society of Japan. It should be noted that the subject matter can also be found in several patent publications, for example, German OLS No. 2,651,140, German OLS No. 2,618,150, French Pat. No. 2,308,590, Japanese application No. 76/21365, German OLS No. 2,628,342, Japanese Patent Publication No. 77/74000, Japanese Patent Publication No. 77/73108 and U.S. Pat. No. 4,052,430 issued Oct. 4, 1977.

The first synthesis disclosed by Yajima and co-workers was the use of metallic lithium to dechlorinate dimethyldichlorosilane to produce dodecamethylcyclohexasilane. The dodecamethylcyclohexasilane is then purified by means of recrystallization and sublimation. It is then heated at 400° C. for 48 hours in an autoclave to produce a product which is polycarbosilane. The polycarbosilane is then treated with solvents to remove low molecular weight fractions and the remaining polycarbosilane is dissolved in benzene or xylene. This product is shown as having a molecular weight of from 1000–2000. The polycarbosilane in benzene or xylene is then spun into fibers by dry spinning.

As admitted by Yajima therein, this method was technically difficult owing to the expensive and time consuming specific chemical reaction, the use of lithium metal, autoclave, acetone fractionation and dry spinning.

As a solution to the difficulties encountered in Yajima's original synthesis, he and his co-workers reported on a second improved synthesis for silicon carbide. The method consisted of the use of mixtures of silanes and metallic sodium in a flask which mixtures were covered by a stream of argon gas. The starting material dimethyldichlorosilane was set up in a dropping funnel and the flask was heated to reflux thereby melting the sodium. With stirring, the dimethyldichlorosilane was added dropwise and the molten sodium dechlorinated the silane to give a precipitate of polydimethylsilanes. The resulting product, in the illustrative example, had an average molecular weight of approximately 3200. The polycarbosilane was thereafter removed using filtration and the metallic sodium remaining with the product was decomposed with methyl alcohol. It was then washed with water twice, dried and placed in a reaction vessel whereupon it was converted to a liquid by heating to 320° C. Thereafter, it was refluxed for 5 hours up to a temperature of 470° C. to remove volatiles. The resulting viscous substance was taken up in n-hexane solution, filtered again and concentrated at reduced pressure and again heated to remove low molecular weight components. The average molecular weight of the final product was about 948 i.e. lower than the polysilane at 3200 indicating that the precipitated polysilane is chopped up and rearranged to give lower molecular weight polycarbosilane.

Yajima's carbosilane polymer i.e. $(CH_3HSiCH_2)_x$ has a maximum theoretical yield of 69% while the material of the instant invention, that is, the polysilane gives a maximum theoretical yield of greater than 80% of SiC without even making any further chemical modification. Yajima's polymer does not have any functional groups left on the polymer for crosslinking sites. Yajima must depend on oxidation at high temperatures to begin to realize any form of crosslinking. Thus, it can be recognized that Yajima's processes and polymers are not the same as those of the instant invention.

Two Japanese publications have described the use of certain silanes to produce polymers. One such publication, O.P.I. No. 80,500/78 describes a process similar to Yajima, in that, a chlorosilane or a mixture of chlorosilanes is treated with an alkali metal in an organic solvent. This method suffers from the same disadvantages as Yajima, that is, low yields and no polymer control. The other publication, Japanese O.P.I. No. 101,099/78, deals with a process similar to the inventive process in that certain chlorosilanes or mixtures of chlorosilanes are treated with quaternary phosphonium salts or hexamethylphosphoramide to prepare liquid polysilanes. The process however does not recognize the critical time and temperature limitations of the instant invention which permit the inventors of the instant invention to prepare solid, hard, glass-like polymers which can be shaped and formed. It should be noted that the process in O.P.I. No. 101,099/78 requires a liquid polysilane and that such liquid is further treated by alkylation to give polycarbosilanes which are then heated to give SiC. The polymers in this alleged Japanese invention give low yields of SiC and are difficult to handle with procedures that are time consuming. Further, the resulting polycarbosilane polymers are intractible and have no functionality for eventual crosslinking which gives the polymers of the instant invention their uniqueness. Further, the process in O.P.I. No. 101,099/78 is not controllable to the extent that polymers with consistent molecular configurations and molecular weights can be obtained. Finally, regarding the prior art processes, it can easily be observed that the multiplicity of steps required by the prior art processes necessarily means more expensive processes and therefore, more expensive products from such processes.

Finally, note should be made of some work being done by Roy Rice which has been described in a U.S. Department of Commerce, National Technical Information Service Bulletin AD-D003-165 which is based on a U.S. patent application Ser. No. 716,729. Rice makes the broad statement that almost any polymer containing silicon can be pyrolized to a ceramic material but aside from two brief examples, the disclosure does not teach those skilled in the art the specific ways and means to the ceramic material. Rice essentially teaches that one can take a silicon containing polymer and heat it to high temperatures and realize a silicon based ceramic material. No explanation in the Rice disclosure gives the necessary detail set forth in Verbeek and Yajima et al., on how one handles the materials, or what starting materials to use or whether volatiles are involved or how they are to be handled. Rice only sets forth commonly known techniques such as the rate of heating, the use of an inert atmosphere and so forth. Throughout the disclosure, Rice speculates on what may happen and his statements are filled with auxiliaries such as would, should and could. It can be said therefore that Rice fails to set forth with particularity what one skilled in the art needs to know to carry out the methods of the instant invention.

The invention disclosed herein overcomes the difficulties of the prior art methods and sets forth a succinct method, easily followed by those skilled in the art, to prepare silicon-carbide.

THE INVENTION

The invention disclosed herein is a very practical, inexpensive, safe method for preparing silicon carbide. The details of why the method is practical, inexpensive and safe are set forth below during the detailed discussion.

What is disclosed is a method of preparing silicon carbide which consists of (A) treating organohalogendisilanes with 0.1 to 10 percent by weight of a catalyst selected from the group consisting of quaternary ammonium halides having the formula $(R')_4NX$, quaternary phosphonium halides having the formula $(R')_4PX$ and hexamethylphosphoramide wherein $R'$ is a member selected from the class consisting of alkyl and aryl radicals and X is a halogen, at a temperature of from 150° C. to 340° C. for a period of 1 to 48 hours while distilling by-produced volatile materials until there is produced a polysilane, which is a solid at 25° C., having the average formula $\{(CH_3)_2Si\}\{CH_3Si\}$ in which polysilane there is from 0 to 60 mole percent $(CH_3)_2Si=$ units and 40 to 100 mole percent $CH_3Si\equiv$ units, wherein the remaining bonds on silicon are attached to either another silicon atom, a chlorine atom or a bromine atom such that the polysilane contains from 10–38 weight percent, based on the weight of the polysilane, of hydrolyzable chlorine or 21–58 weight percent based on the weight of the polysilane of hydrolyzable bromine, (B) forming a shape from said polysilane, (C) heating the shape in an inert atmosphere or in a vacuum to an elevated temperature in the range of 1150° C. to 1600° C. until said polysilane is converted to silicon carbide.

Also disclosed is a composition of matter which is a polysilane which is a solid at 25° C. which polysilane has the average formula $\{(CH_3)_2Si\}\{CH_3Si\}$ in which polysilane there is from 0 to 60 mole percent $(CH_3)_2Si=$ units and 40 to 100 mole percent $CH_3Si\equiv$ units, wherein the remaining bonds on silicon are attached to either another silicon atom, a chlorine atom or a bromine atom such that the polysilane contains from 10–38 weight percent, based on the weight of the polysilane, of hydrolyzable chlorine or 21–58 weight percent based on the weight of the polysilane of hydrolyzable bromine.

The amount of chlorine or bromine in the polysilane can also be described as the ratio of silicon to chlorine atoms. Thus, a ratio of 7.5:1 to 1:1 is essentially equivalent to 10–38 weight percent of chlorine or 21 to 58 weight percent of bromine in the polysilane. Either representation of the amount of halogen is satisfactory. The polysilane polymer useful in this invention can be obtained from any source as long as the starting material contains the disilane, $(CH_3)_xCl_{3-x}SiSiCl_{3-y}(CH_3)_y$ where x is a whole number equal to 0 to 3 and y is a whole number equal to 0 to 3 and the sum of $x+y$ is equal to at least one and generally between 2 and 4.

The disilane can be prepared from the appropriate silanes or the disilane can be utilized as it is found as a component of the process residue from the direct synthesis is organochlorosilanes. The direct synthesis of organochlorosilanes involves passing the vapor of an organic chloride over heated silicon and a catalyst. See Eaborn, "Organosilicon Compounds," Butterworths Scientific Publications, 1960, page 1. The disilane, $CH_3Cl_2SiSi(CH_3)_2Cl$ is found in large quantities in the residue from the reaction and therefore, this Direct Process Residue (DPR) is a good starting material for obtaining the polysilane polymer used in this invention.

In practice, the DPR is treated with a catalyst and heated while monomeric silanes are distilled away. If DPR is used rather than the pure disilane, the presence of other organosilicon compounds in the DPR does not significantly affect the inventive method or the end result because upon treatment of the DPR with catalyst, a rearrangement takes place which forms volatile useful silanes and the polysilane polymer, the polymer as shown by the formula in step (A). The silanes are distilled from the reaction mixture as they are formed. It will be observed that removal of the volatile silanes enhances the rate of the reaction. These silanes are utilized commercially in other areas and therefore, their value offsets some of the cost of operating under the instant invention. The preparation of the monomeric silanes by the initial step of this invention has been disclosed by Alfred R. Gilbert and Glenn D. Cooper in U.S. Pat. No. 2,842,580 issued July 8, 1958.

In that patent, there is disclosed the use of quaternary halides as catalysts for cleaving organohalogenpolysilanes i.e. disilanes to obtain low molecular weight monosilanes. The examples illustrate that the silanes were prepared by treating the disilanes with the catalysts and refluxing by heating the reaction flask to 153° C. and allowing the temperature of the flask to gradually fall to about 119° C. The newly formed monomeric silanes were then distilled from the pot. The difference between the Gilbert et al. disclosure and the instant invention is that Gilbert et al. did not reach the critical factors for obtaining the useful polysilanes of this invention. They did not remove produced monomeric silanes when the 153° C. temperature was reached. They did not reach at least 150° C. on distillation. They did not reach or exceed 150° C. for a period long enough to produce the polysilane polymer.

For purposes of this invention, the polysilane consists principally of $(CH_3)_2Si=$ units and $CH_3Si\equiv$. The remaining valences on these silane units are satisfied by another silicon atom or a halide atom. Thus, contemplated within the scope of this invention are polysilanes having an average of 0.1 or more halogens per silicon atom. For example, other units can be (where Hal is halogen), $(Hal)_2Si=$, $CH_3HalSi=$, $CH_3(Hal)_2Si-$, $(CH_3)_2HalSi-$, $(Hal)_3Si-$, $(CH_3)_3Si-$ as long as the silicon to halogen ratio of 7.5:1 to 1:1 is maintained.

Halogen, for purposes of this invention, is chlorine or bromine and preferably chlorine. The other halogens, i.e. iodine and fluorine undergo undesirable side reactions and are difficult to handle so they are not useful in this invention. It is preferred, for purposes of this invention, that all the halogen groups on the disilane are the same halogen but it is also within the scope of this invention to have both chlorine and bromine groups on the disilane.

The polysilane useful in this invention is not easily analyzed because of the nature of the material. The molecular weight of the polysilane can only be estimated.

The catalysts that are useful are rearranging catalysts and examples of such catalysts are ammonium halides, tertiary organic amines, quaternary ammonium halides, phosphonium halides, hexamethylphosphoramide and silver cyanide.

Preferred are the phosphonium halides and the quaternary ammonium halides and hexamethylphosphoramide. Most preferred are the phosphonium halides, for example, tetrabutylphosphonium chloride.

The amount of catalyst utilized can range from 0.001 to 10 weight percent based on the weight of the starting disilane. The catalysts and starting materials require anhydrous conditions and therefore one must take care to insure that moisture is excluded from the reaction system when the disilane and catalyst are mixed. Generally this can be done by using a stream of dry nitrogen or argon as a cover over the reaction mixture. Generally, since the pyrolysis of the pre-silicon carbide polymer is carried out in an inert atmosphere, the use of nitrogen can serve a dual purpose. It is within the scope of this invention to utilize vacuum rather than an inert gas.

Other significant aspects are the low temperature at which this reaction can be run and the fact that pressure is not required. The reaction to form the inventive polysilane polymer and the volatile silanes is usually carried out at 150° C. to 340° C. for 1 to 48 hours.

After the polysilane (I) is prepared, it can be utilized as a melt to spin fibers and form shapes. It should be noted that the polymers so formed are clear and are solids at 25° C. They do not require dilution but can be diluted with solvents in order to lower the viscosity for spinning or drawing fibers.

The polymer melt, i.e. the polysilane polymer in whatever form is desired, is then pyrolyzed in an inert atmosphere or vacuum to obtain the silicon carbide. Such pyrolysis procedures are carried out at temperatures in the range of 1150° C. to 1600° C. for 0.1 to 4 hours.

In summary then, the method is carried out by placing a disilane, or DPR containing the disilane, in a reaction vessel filled with an inert gas and there is added thereto the proper amount of catalyst. The reaction is heated and the volatile silanes are formed and are continuously removed. When the proper viscosity of the residue in the reaction vessel is reached, the reaction is terminated by lowering the temperature. The residue remaining in the reaction vessel is the inventive polysilane polymer. This material, as a melt, can be formed at this point and then pyrolyzed to give the silicon carbide.

It should be noted that no special procedure is required for mixing the disilane and catalyst. The catalyst and disilane can be mixed all at once and stirred with a paddle stirrer. The silanes can be removed through the use of simple distillation apparatus.

Now, so that those skilled in the art can better understand and appreciate this invention, the following examples are given.

EXAMPLE 1

A 250 ml. 3-necked glass flask was equipped with a nitrogen inlet tube, thermometer and condenser affixed to a toluene bubbler trap. The trap was equipped with a bleedline to a vented hood. A vaccum was drawn on the flask and then the flask was flushed with dry nitrogen. The nitrogen flow was continued after 0.5 gms of tetrabutylphosphonium chloride was added to the flask and heated to melting. DPR, 400 gms was slowly added to the flask after the initial addition of 30–50 milliliters. After 10 minutes, distillate was seen to collect in the receiving flask. The flask temperature was about 105° C. at this time. The DPR was slowly added over the next three hours and the temperature rose to 150° C. During the course of the next five hours the temperature remained the same and the distillate temperature never exceeded 65° C. The reaction was shut down but the nitrogen flow was maintained. After setting overnight (approximately 16 hours), the flask was heated again to 250°–270° C. After eight hours of collecting distillate at less than 80° C. head temperature, the heating was stopped. These remained in the flask a viscous, yellow fluid that cooled to a yellow wax-like solid. The material when reheated began melting at approximately 100° C. When cooled, a portion of the material was chipped from the flask and it was soluble in toluene.

EXAMPLE 2

A flask containing 654.5 gms of DPR and 7.7 gms of tetrabutylphosphonium chloride were placed in a round-bottomed flask which was fitted with a thermometer, condensers, heating apparatus and a distillation apparatus and slowly heated while silane were distilled over up to a temperature of 340° C. The residue upon analysis had 11.0 weight percent hydrolyzable chlorine. The chlorine ion was titrated in a non-aqueous solution of toluene and isopropanol using a 0.1% solution of tetrabromophenolphthalein ethyl ester in methanol/toluene solution and 0.5N KOH in ethanol. The higher the temperature is raised, the more halide that is removed from the polysilane. Removal of too much halide results in a non-handleable material. In this example, the appearance of solids indicated that the polysilane was on the verge of crosslinking to an unhandleable material at 340° C. or approximately 10 to 11.0 weight percent chlorine.

Additional runs were made at temperatures of 300° C. and 325° C. A summary of all the runs can be found below.

| T° C. | Avg % Cl from two titrations |
|---|---|
| 300 | 12.0 |
| 325 | 11.9 |
| 340 | 11.0 |

Additional heating to give approximately 10 weight percent chlorine gives a polysilane with a significant amount of solid material in it at the elevated temperature.

EXAMPLE 3

An apparatus similar to that set forth in Example 1 was assembled and 60 gms of $\{Cl_2MeSi\}_2$ was added to the flask along with 0.6 gms of tetrabutylphosphonium chloride catalyst. These materials were heated and volatiles were removed over a period of approximately two hours at which time the pot temperature reached 250° C. When the flask was cooled, a hard, glassy polymer was obtained which had a chlorine content of 19.65 weight percent.

EXAMPLE 4

A reaction similar to that performed in Example 3 was carried out using 0.3 weight percent hexamethylphosphoramide. The temperature was slowly raised to 120° C. where it was held until volatiles ceased distilling (48 hrs). The resulting material, even though it had a low chlorine content, was a liquid at 25° C. No fibers could be pulled from the liquid nor could the material be formed. This material does not fall within the scope of the instant invention.

EXAMPLE 5

A reaction vessel was set up as in the above examples and there was added thereto the following: 401.8 gms of mixed silanes of $\{Cl_2CH_3Si\}_2$, $Cl_2CH_3SiSi(CH_3)_2Cl$ and $\{Cl(CH_3)_2Si\}_2$ in the approximate volume ratios of 53:36:11. To this was added 3.9 gms of hexamethylphosphoramide. Upon addition of the amide, the hazy solution cleared and was yellowish in color. All stoppers were tightly bound and the flask was purged with argon. Heating was commenced. Within one-half hour, 100° C. was reached and clear distillate started. In 2 hours, 150° C. temperature was reached. The heating at 150° C. was continued for 47 hours. When the flask was cooled, there resulted a light yellow, clear material which was a solid. It had about 11.3% hydrolyzable chlorine. When an equivalent run was made using 1% tetrabutylphosphonium chloride, a simlar yellow, solid, clear material was obtained. When the reaction was carried out using 1% tetrabutylphosphonium chloride for 103 hours, a similar material was obtained.

EXAMPLE 6

DPR (400 gms) and 4 gms of tetrabutylphosphonium chloride were placed in a flask as set forth above. The mixture was heated to 250° C. where it was held for three hours all the while under an argon flow. This material was a clear solid and had a chlorine content of 16.1%.

EXAMPLE 7

DPR (460.6 gms) and 4.8 gms of tetrabutylphosphonium chloride were placed in a 500 ml, 3-necked, round-bottomed flask. It was equipped as shown in Example 1. The entire system was maintained under an argon flow. Heat was applied and a clear solution began to distill at about 108° C. pot temperature. The pot temperature was raised to 140° C. for 48 hrs. The resulting polymer was orange in color and clear. It contained 29.4% hydrolyzable chlorine and was a fluid at room temperature. This example clearly shows that the temperature of 150° C. is required to obtain the polymers of this invention.

EXAMPLE 8

Tetrabutylphosphonium chloride (0.5 gms) was weighed into a 3-necked flask equipped as in Example 1 above. The system was evacuated and then refilled with dry nitrogen gas. Fifty grams of DPR was then added and heating was started. Distillation began at 55°–60° C. with a pot temperature of 100°–128° C. The reaction was run at about 120° C. to 135° C. for 5 hours and then the temperature was raised to 160° C. for one hour. Samples were taken periodically, one at 2 hours at 120° C., one at 3 hours at 120° C., one at 5 hours at 133° C. and one at 6 hours at 160° C. These were labelled A, B, C and D respectively. Samples A, B and C were liquids. Sample D was a waxy solid. A sample of Sample D was pyrolyzed in a furnace at 1400° C. for 2 hours to give a silicon metal free beta-SiC which had a crystallite size of approximately 190A as shown by x-ray diffraction.

That which is claimed is:

1. A product which is produced by a method which consists of treating organohalogendisilanes with 0.1 to 10 percent by weight of a catalyst selected from the group consisting of quaternary ammonium halides having the formula $(R')_4NX$, quaternary phosphonium halides having the formula $(R')_4PX$ and hexamethylphosphoramide wherein R' is a member selected from the class consisting of alkyl and aryl radicals and X is a halogen, at a temperature of from 150° C. to 340° C. for a period of 1 to 48 hours while distilling by-produced volatile materials until there is produced a chlorine containing or a bromine containing polysilane, which is a solid at 25° C., having the average formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein the remaining bonds on silicon are attached to either another silicon atom, a chlorine atom or a bromine atom such that the polysilane contains from 10–38 weight percent, based on the weight of the polysilane, of hydrolyzable chlorine or 21–58 weight percent based on the weight of the polysilane of hydrolyzable bromine.

2. A composition of matter which is a chlorine containing or a bromine containing polysilane which is a solid at 25° C. which polysilane has the average formula $$\{(CH_3)_2Si\}\{CH_3Si\}$$

in which polysilane there is from 0 to 60 mole percent $(CH_3)_2Si\!=\!$ units and 40 to 100 percent $CH_3Si\!\equiv\!$ units, wherein the remaining bonds on silicon are attached to either another silicon atom, a chlorine atom or a bromine atom such that the polysilane contains from 10–38 weight percent, based on the weight of the polysilane, of hydrolyzable chlorine or 21–58 weight percent based on the weight of the polysilane of hydrolyzable bromine.

* * * * *

UNITED STATES PATENT AND TRADEMARK OFFICE
CERTIFICATE OF CORRECTION

PATENT NO. : 4,310,651

DATED : January 12, 1982

INVENTOR(S) : Ronald H. Baney, John H. Gaul, Jr.

It is certified that error appears in the above-identified patent and that said Letters Patent is hereby corrected as shown below:

In column 4, line 51, "is organochlorosilanes" should read -- of organochlorosilanes --.

In column 6, line 64, "These" should read --There--.

In column 8, line 5, "a simlar yellow," should read -- a similar yellow --.

In column 8, line 49, "190A" should read -- 190Å --.

Signed and Sealed this

Eleventh Day of June 1985

[SEAL]

Attest:

DONALD J. QUIGG

Attesting Officer     Acting Commissioner of Patents and Trademarks